Sept. 10, 1929.   H. S. PARDEE   1,727,840

DIRECTORY

Filed June 11, 1927   4 Sheets-Sheet 1

Harvey S. Pardee,
Inventor,
Delos G. Haynes
Attorney

Sept. 10, 1929.  H. S. PARDEE  1,727,840
DIRECTORY
Filed June 11, 1927   4 Sheets-Sheet 2

Harvey S. Pardee,
Inventor,
Delor G. Haynes,
Attorney

Sept. 10, 1929.　　　　H. S. PARDEE　　　　1,727,840
DIRECTORY
Filed June 11, 1927　　　4 Sheets-Sheet 3

Harvey S. Pardee,
Inventor,
Delos G. Haynes,
Attorney

Sept. 10, 1929.                H. S. PARDEE                1,727,840
                                  DIRECTORY
              Filed June 11, 1927         4 Sheets-Sheet 4
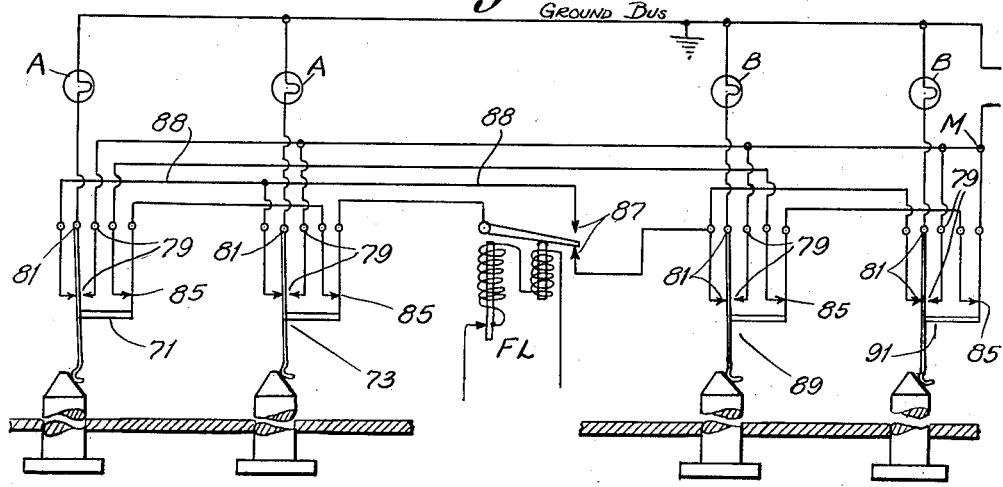
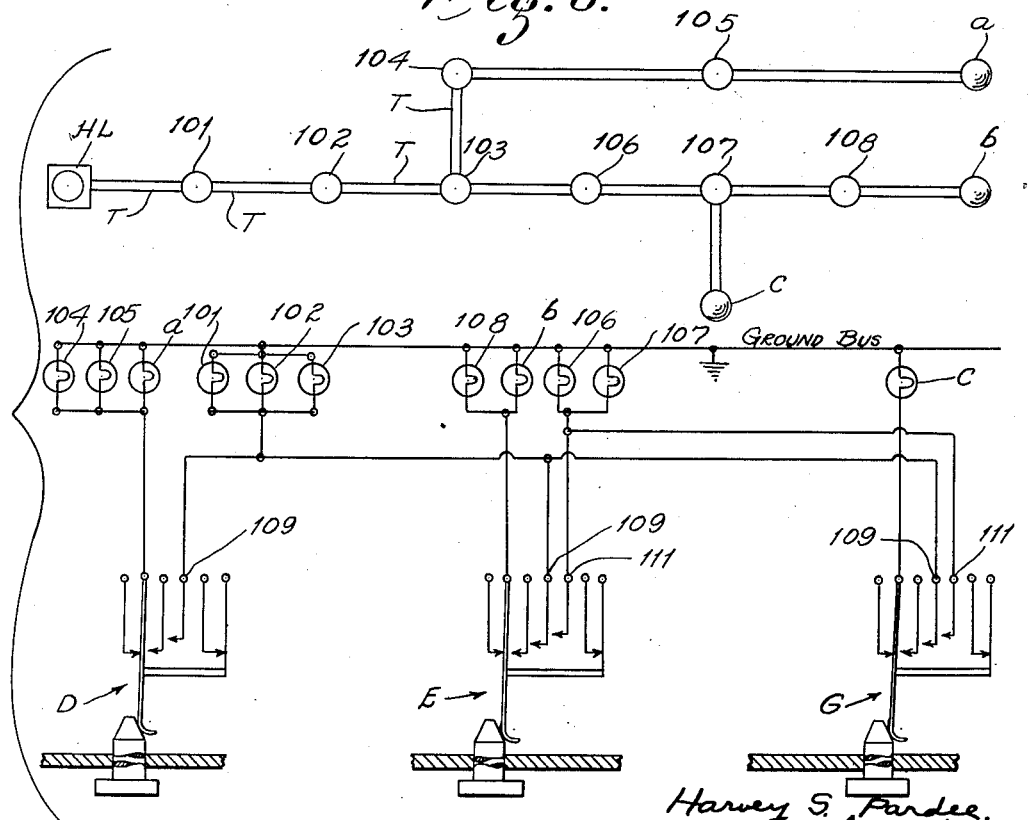

Patented Sept. 10, 1929.

1,727,840

UNITED STATES PATENT OFFICE.

HARVEY S. PARDEE, OF RAVINIA, ILLINOIS, ASSIGNOR TO EARL B. FLYNN, OF ALTON, ILLINOIS.

DIRECTORY.

Application filed June 11, 1927. Serial No. 198,183.

This invention relates to displays and with regard to certain more specific features to electric displays in the form of directories.

Among the several objects of the invention may be noted the provision of a useful and attractive display in the form of a directory map in which a twinkling or flashing effect is had with regard to stations located thereon; the provision of a display of the class described in which one who views it may press one of a plurality of directory buttons and thereby eliminate the twinkling effect, leaving lighted only the home station at which the map is located and the particular station or stations and the like which the directory button is adapted to light up for directory purposes; the provision of a display directory of the class described having means for lighting predetermined highways or routes throughout their lengths; the provision of a device of the class described in which the home station light is energized in an improved manner; the provision of a device of the class described having a simplified electrical system; and the provision of such a device which is rugged and economical in mechanical construction but which on the other hand is exceedingly attractive. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a diagrammatic front elevation of the display;

Fig. 7 is a wiring diagram showing an alternate form of the invention; and

Fig. 8 is a wiring diagram showing another alternative.

Corresponding reference characters indicate corresponding parts throughout the several views of the drawings.

Figure 1:
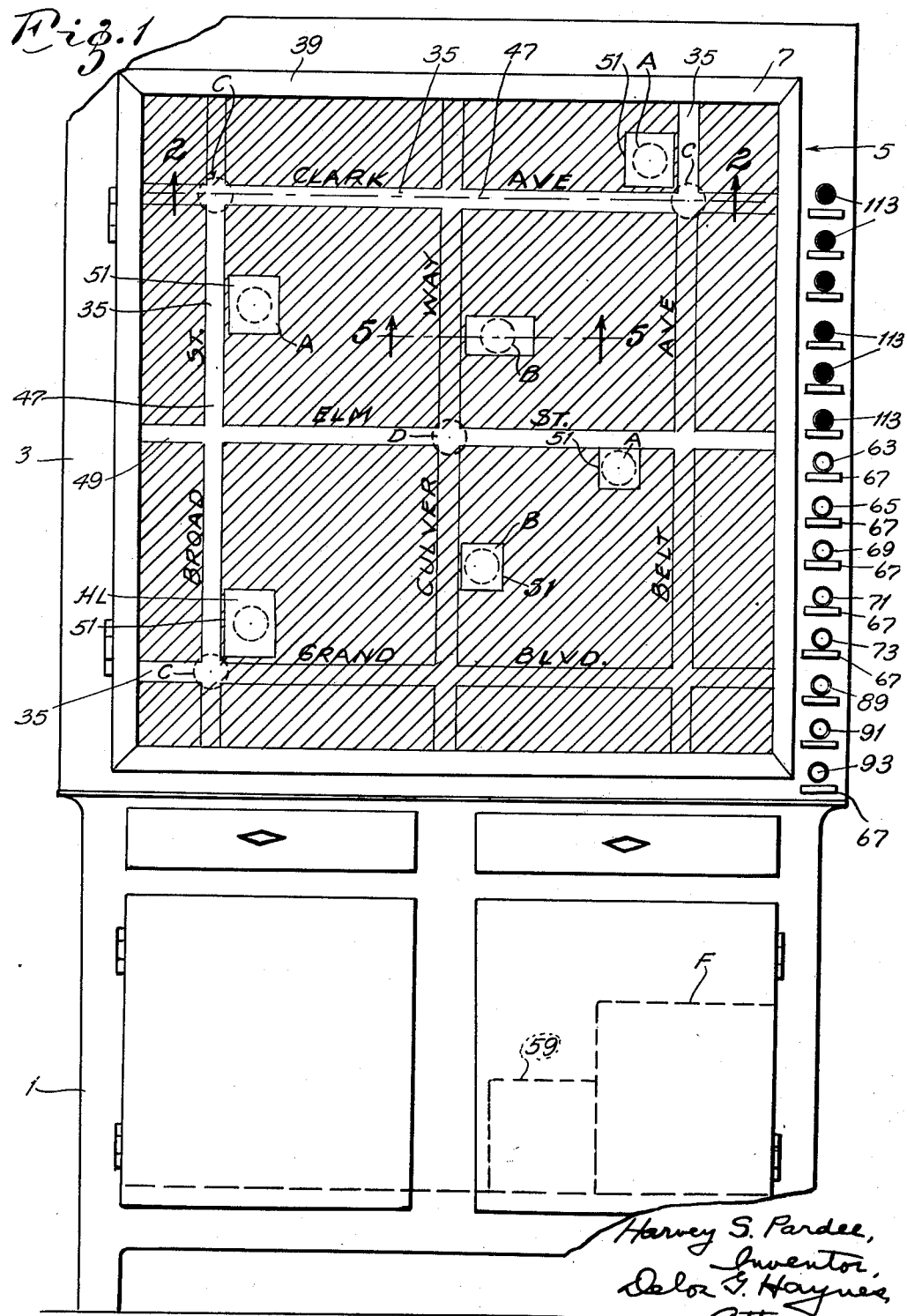

Referring now more particularly to Fig. 1, there is illustrated at numeral 1 a support or cabinet which is adapted to house certain devices 59 and F, hereinafter to be described. This cabinet 1 has removably joined thereto a stationary background portion 3, a typical cross section of which is illustrated in Fig. 2.

The background portion 3 comprises an immovable part 5 (which may be detachably secured to a wall or elsewhere) and a hinged part 7 (which is hinged to the immovable part). It is to be understood that the immovable part 5 may be entirely supported by the cabinet 1 or it may be secured to a wall or the like, as described, and the part 1 may depend therefrom. The exact shape of the cabinet is immaterial.

The background portion 3, with its hinged portion 7 forms a directory map; having lighting stations thereon and preferably has the following novel construction (see Figs. 1 to 5). There is provided a supporting panel 9, composed preferably of three-quarter inch ply wood. This panel 9 is faced on its forward side with about one-eighth inch copper or other conducting sheeting 11, the panel 9 and the sheeting 11 being held together by means of a plurality of bolts 13.

Figure 2:
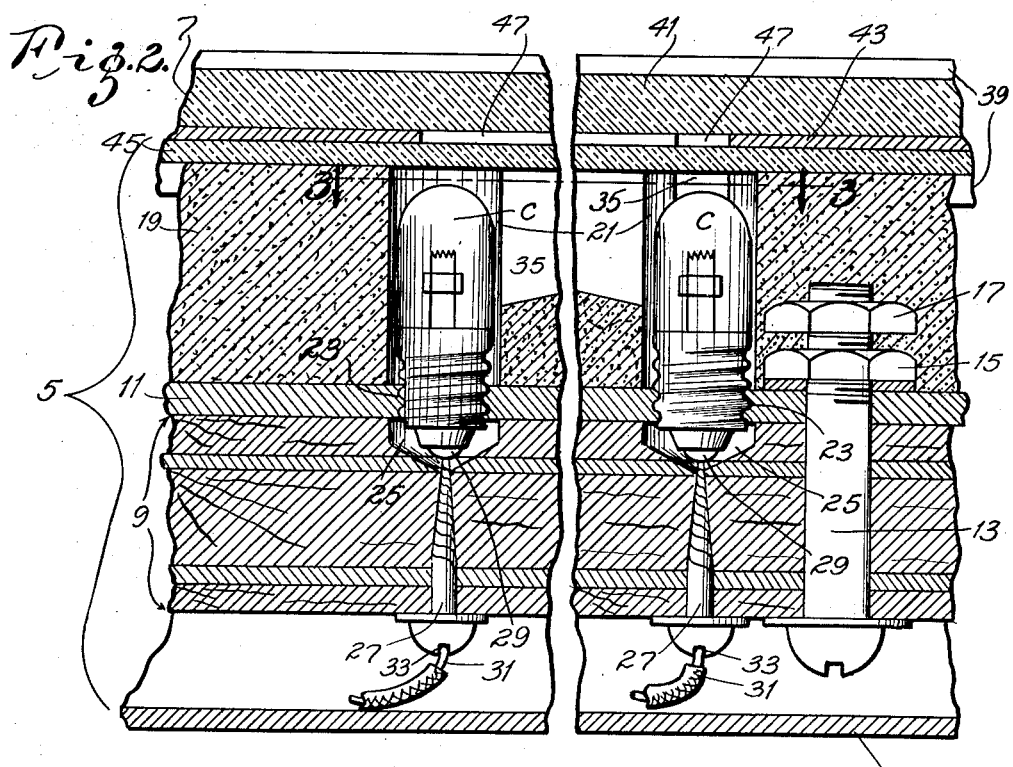
Fig. 2 is a cross section taken on line 2—2 of Fig. 1 and shows the improved mechanical construction used.
Figure 5:
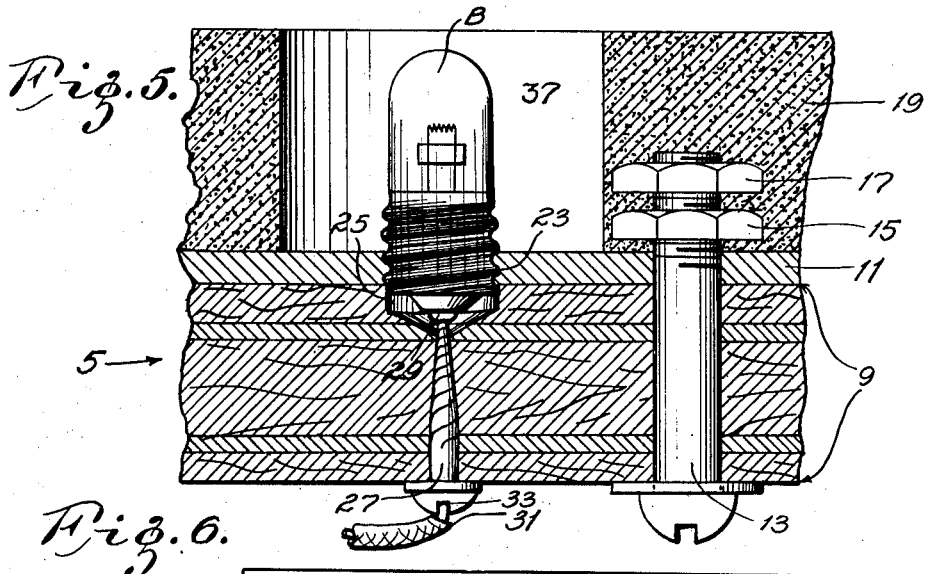
Fig. 5 is a fragmentary section taken on line 5—5 of Fig. 1 and shows the manner of mounting a lamp at a station.

As illustrated in Figs. 2 and 5, the bolts 13 are provided with one nut 15 for holding or clamping purposes and a second nut 17, spaced with respect to said nut 15, the purpose of the spaced nuts 17 being to provide a key for a plaster-of-Paris or like plastic facing 19 which is molded over the sheeting 11 and left to harden.

The purpose of the facing 19 is to provide a relatively soft or chalky surface which may be readily carved, cut and worked into recesses, holes, sockets, grooves and other shapes for the purposes to be described. The material is adapted to be worked while in place after hardening from the plastic condition. For instance, in Fig. 2, there are illustrated two holes or sockets 21 formed through the plaster facing for receiving lamps C. The copper sheet 11 at the bottoms of the holes or sockets 21 (and at the bottoms of all other lamp sockets) is bored and tapped out, as at sockets 23, to receive the lamps in the usual screw fashion at one of the lamp terminals. The backing 9 is also recessed beneath the tapped holes as at points 25. Screwed in from the rear of the backing 9 are wood screws 27 which enter the holes 25 and are adapted to be engaged by the soft central contactors 29 of said lamps C. Each screw 27 has soldered or otherwise connected thereto an electrical lead 31. It is evident that the lamps C may be fed current from the leads 31, which current passes through the lamp filaments and may return to its source through the conducting copper sheet 11. In other words the sheet 11 is a ground bus which eliminates substantially one-half of the wiring which would ordinarily be required to put these lamps in circuit, and hence a great saving in construction is effected.

Figure 4:
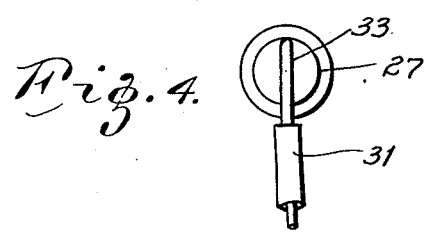
Fig. 4 is a plan view of a typical soldered connection with a contact screw.

In Fig. 4 is shown the economical way in which the leads 31 may be soldered directly into the ordinary slot 33 required for the screw driver in a wood screw. The backing 9 and facing 19 are insulators.

Fig. 2 shows two lamps C of a group of three lamps C (shown in Fig. 1) which lamps are adapted to light up a predetermined street route. In order that a minimum number of lamps may light a route, they are placed in sockets similar to the sockets 21 and the intervening distance is cut as a slot 35 having a slightly sloping bottom. The result is that the white plaster reflects the light from the grooves excellently, to form a route marking, when taken in combination with the map construction to be described. By a route marking is meant a marking showing a highway, or through route such as a known highway, street railway or the like.

Figure 3:
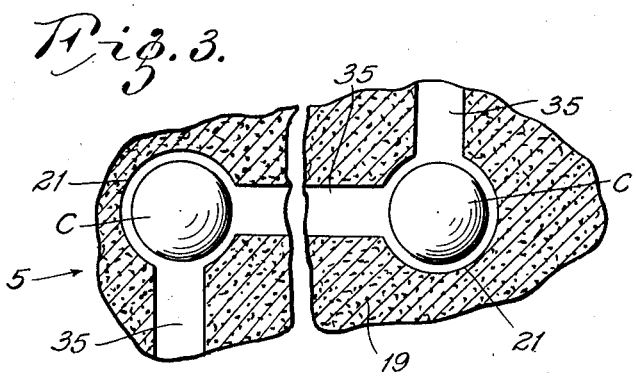
Fig. 3 is a fragmentary section taken on line 3—3 of Fig. 2.

Fig. 3 illustrates how the routings are cut in the plaster. It has been ascertained that about one lamp is required for every two blocks of map illustration. It is to be understood that in actual practice the street intersections will be about one and one-half to two inches apart but Fig. 1 exaggerates the sizes of blocks for purposes of clarity.

Fig. 5 illustrates how the plaster facing 19 is cut away to receive a station lamp B (not a route marking lamp). In this case the construction is similar to the aforesaid construction, except that the socket 37 may be made to correspond (at the upper surface of the facing 19) with the shape of the building plan to be portrayed on the map. The sides of the socket reflect the light. It is evident that all of the station lights may be positioned in a similar manner within reflecting sockets. The sockets may have curved reflecting surfaces instead of straight ones, if desired.

The hinged portion 7 (Fig. 2) comprises a demountable frame hinged to said portion 3. This frame carries therein a preferably plate glass front 41 having an opaque paper or like map 43 held against its inner surface by means of a rearward sheet of preferably ordinary window glass 45. The glass 45 faces and is juxtaposed against the upper surface of the facing 19 when the hinged portion 7 is shut. It is evident that the frame 39, being adapted to be disassembled, permits of changing maps, when desired. The map may be held to the glass 41 by any other suitable means, the glass 45 not being the only means.

The opaque map 43 in question is opaque at all points except along the routes and at the stations. At these points or areas it is cut away, leaving only the transparent glass 45 and 41. For instance, it is provided with a cut-out portion 47, adapted to align with the route slot 35 therebeneath in the plaster 19. Hence the route marking is visible from the front of the device because the lamps C shine down the slot 35 in the plaster facing 19 and said slot reflects the light out through the opening 47 in the opaque map. The cut away portions such as at 47 may also comprise mere transparencies in the map paper or other transparent means.

In the illustration (Fig. 1) another highway opening 49 is shown in the map, lighted by a route lamp D. Also, various shapes of station openings 51 through the map are shown lighted by lamps A and B, positioned in suitable sockets beneath openings 51 corresponding to the socket 37, shown in Fig. 5. The opaque portions of the map 43 are cross hatched in Fig. 1 to distinguish them from the cut-out portions. The opaque portions are marked in the usual way that maps are marked to be consistent with the features designated by the cut-out portions. The hinged portion 7 serves for the purpose of replacing burned out bulbs and making other changes or repairs when desired. As illustrated in Fig. 2, a removable back 53 is provided so that the terminals 31 may be reached.

Figure 6:
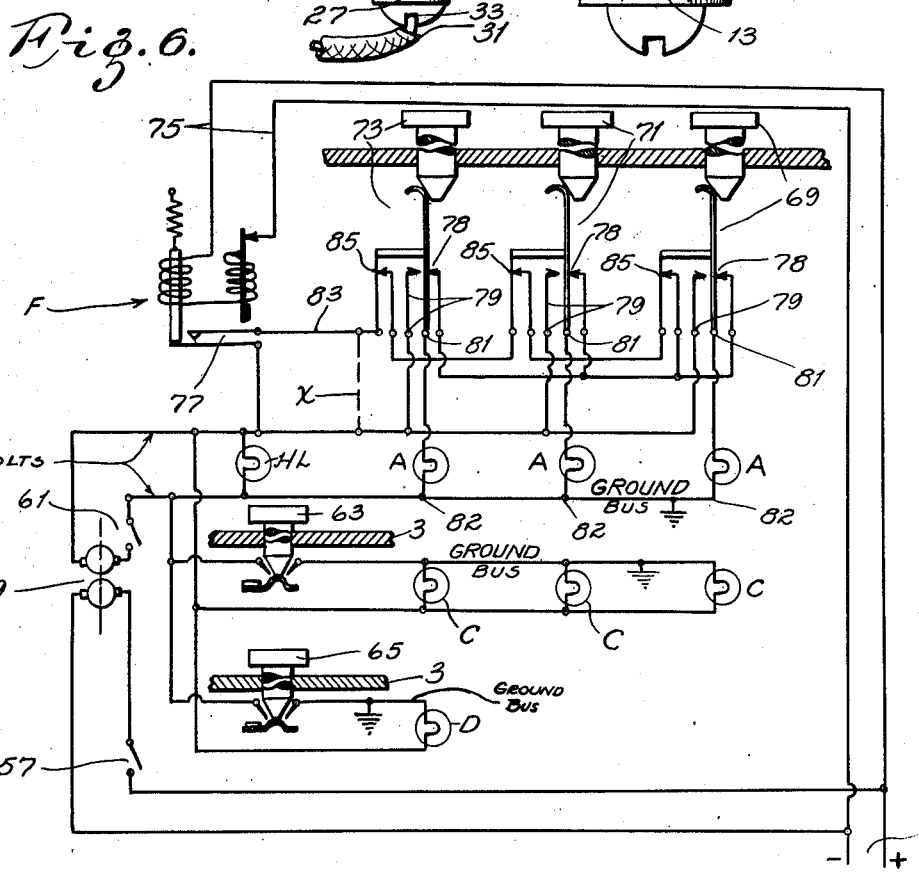
Fig. 6 is a wiring diagram of one form of the invention.

In Fig. 6 is shown one form of wiring diagram which may be used for this display. This diagram illustrates the manner in which the route lights C and D may be selectively lighted, a home light HL and the three station lights A. The added station lights B are shown in Fig. 1 for the purpose of illustrating the use of a second wiring diagram shown in Fig. 7.

An ordinary 110-volt circuit 55 is used to supply the energy to the power circuit of the present device. However, in order to minimize the expense for wiring, installation and inspection, the wired board 9 operates on six volts. To accomplish this, there is provided on the work side of a line switch 57 a 110-6-volt translator 59. The device 59 is referred to as a translater because if the circuit 55 comprises a direct current source, then the translator 59 is either a motor-generator (110-volt direct current motor driving a 6-volt direct current or alternating current generator) or an inverter (a rotary converter driven by 110-volt direct current and generating 6-volt alternating current; or possibly a dynamotor generating 6 volt direct current).

If the source of power at 55 is alternating current, then the translator is merely a transformer of suitable capacity to provide 6 volts on the secondary side.

A secondary switch 61 is used in the 6-volt board circuit. The light known as a home light HL or the one showing the position on the map at which the present display is located, preferably burns continuously, that is, it is connected directly across this 6-volt circuit (see Fig. 6). The group of lamps C and the lamp D (route markers) are also connected directly across this 6-volt circuit with switches 63 and 65 in series respectively. The switches 63 and 65 are of the ordinary return or restoring push button type, which normally break the respective lamp circuits, but when pressed temporarily light them. The switch buttons 63 and 65 are placed on the portion 3 of the board (see Fig. 1) with suitable plates 67 below them for designating to the user of the board what route will be lighted when he presses the corresponding button.

In this modification, the route lights C and D are normally dark and it is evident that other similar lights may be connected in by switches to be normally dark and to indicate stations, but such are not shown herein for the purpose of simplicity.

However, the group of station lights A are shown in Fig. 6. These lights A are all in a flasher circuit which normally keeps these station lights A flashing on and off. Push button switches 69, 71 and 73 are provided for cancelling the flashing effect and maintaining a desired station lighted for directory purposes, while the other stations, not the home station light HL, are dark.

In order to accomplish the above, the flasher F is provided, which may be of the thermal type illustrated or it may be of the mechanical type. This flasher is operated by a line 75 direct from the 110-volt circuit 55. The functioning of these flashers is not new per se and will not be described herein, except to say that the present flasher F continually opens and closes the contacts 77 at predetermined intervals.

The contacts 77 are connected across the 6-volt circuit through the set of push button order wire switches 69, 71 and 73 and the respective lamps A. In the normal positions shown, of the switches 69, 71 and 73, each lamp A flashes when the contactor 77 is closed, because each switch has normally closed contacts 78 and 85 leading to the contactor 77.

Whenever a particular one of said switch buttons 69, 71 or 73 is pressed by an operator, the result is that the corresponding lamp A is put in circuit across the 6-volt line, while the other lamps A, by opening the one contact 85 are cut-out of the circuit passing through the contactors 77. The result is that the particular desired station (marked on the corresponding plates 67) is lighted up and the remainder (which were previously flashing) are darkened. Hence the operator has his steadily burning home light HL as a reference with the now steadily burning station light A. When the button is again released all of the station lights again flash continuously.

It will be seen from Fig. 6 that the reason for the above operation is that each of the switches 69, 71 and 73 having a closing terminal 79 for putting its respective lamp directly in the 6-volt circuit without the flasher in circuit, that is, when the respective switch button is pressed. Normally this closing contact or terminal 79 is an open circuit, that is, when said contact 78 is closed.

The terminal 81 of each switch is adapted to feed current into the circuit 83 of the contactor 77 when the switches are in normal unpressed condition. This is accomplished through the switch contacts 85 in series. This puts the lamps A in parallel between the 6-volt circuit terminals 82 and the flashing contactor 77.

Whenever a push button is pressed, the respective lamp is closed across the 6-volt line through its respective then closed terminal 79, while the other terminals 78, 85 are opened, thereby preventing the other lamps from being connected in circuit by way of the contactor 77. This is because one of the series contacts 85 is then open, to prevent return of current by way of said contactor 77. Current can only flow through the lamp whose switch is closed because this will be the only switch having a closed return 79 to the circuit (not through the flasher).

The mechanical construction of the switches 69, 71 and 73 is not shown because it is conventional. As stated, it is to be understood that the flasher F may be of the motor driven type if desired.

In Fig. 6 is shown a dotted line X which represents a connection for putting all of the stations A on continuously instead of flashing.

The operation is the same, except that when a given button is pressed, instead of cancelling a flashing effect, the operator cancels a steady burning effect and leaves lighted only the home light and the described one station light.

It is evident that two or more station lights may be lighted at one time by pressing the requisite number of buttons. Furthermore, one or more routes may be lighted at the same time that one or more station lights are on or flashing, by pressing the requisite number of buttons. Each button has one of the plates 67 therebeneath, indicating what station will be lightened if the respective button is pressed.

In Fig. 7 is shown another form of circuit in which the flasher FL is provided with two sets of contacts 87 operable alternately and connected into lines 88 and switches 71, 73, 89 and 91 in such a manner that a group of lamps A (a portion of the lamps A mentioned hereinbefore) and a group of lamps B (shown in Fig. 1) will be flashed on and off alternately. This is, because when no one of the switches 71, 73, 89 or 91 is pressed, then the lamp banks A and B are connected respectively with the switches 71, 73 and 89, 91 (see switch contacts 81) and energized through either one or the other of said pair of contacts 87 and then in series through the contacts 85 of said switches 71, 73 and 89, 91 and thence to the point M.

The above means that the flasher ordinarily operates the groups of lamps A and B alternately but when any one of the switches 71, 73, 89 or 91 is pressed, the corresponding lamp will remain lighted while all of the other lamps A or B will be darkened. This happens because the opening of a contact 85 darkens all other lights which normally return current to the point M through that contact. At the same time the lamp in question is lighted through a contact 79. It is to be understood that only such portions of the circuits are shown in Fig. 7 as will clarify the alternative operation. Route lights which have been described previously and other details are not shown.

The effect is that when one approaches the board, he sees two groups of station lights A and B flashing on and off alternately and a steadily burning home light HL. When he desires to locate a particular place, he presses the proper button as indicated by the plate 67, and the result is that if he has pressed a station button all stations cease flashing, except the one corresponding to the button pressed. The home light remains burning in the manner predetermined therefor, unaffected by the switches, except the main switches, except the main switches 57, 61.

If the operator has pressed a route button, instead of a station button, the result is a steady lighting of the corresponding route while the two groups of station buttons continue to flash alternately.

It is evident that the home light may also be put into a flasher circuit such as to be unaffected by pressure of any switch button, in the same manner that it is unaffected while burning steadily.

The construction under the two modifications stated, may be had, or some station lights may be made to flash while others are nominally dark, or some two groups may be made to flash alternately while others are dark and other changes may be thought of under the principles taught by this invention.

The percentage of station lights that should be on the flasher or the manner of flashing, depends on the amount of brilliance that is desired, and the amount of current that the proprietor is willing to use. The groupings of the lamps A and B such as in Fig. 7 need not be equal. It should be noted that with the type of switch used herein the number of contacts on each switch for a given group of lights is independent of the number of stations in that group of lights.

In Fig. 8 is shown another alternative manner in which certain other routings (not shown in Fig. 1) may be made to light up. These routings or routes are to be distinguished from the previously described routes which were for the purpose of designating certain established ways through a given region. The present temporary directing route or ways are adapted to show the "way to go" from the home station to a selected station. These different routes are to light up when the selected station button is pushed and to darken when it is released. Such routes may overlap each other, using in part the same lights.

Referring now particularly to the diagrammatic Fig. 8, which shows only such details as are necessary for the diagramming and the wiring of the modification, there is shown the home light connected by thoroughfares T with stations $a$, $b$ and $c$, said thoroughfares being lighted by lamps at suitable distances. The lamps are numbered consecutively from 101 to 108 inclusive. It should be noted that the thoroughfares to the three stations $a$, $b$ and $c$ overlap one another in part.

The wiring diagram for this combination is also shown in Fig. 8 in which it will be seen that the lights 104 and 105 are always in parallel with the station light $a$, said station light $a$ being connected to a push button return switch D in the manner hereinbefore set out.

Also, the route lamp 108 is always in parallel with the station lamp $b$, said station lamp $b$ being connected to a push button return switch E.

The station lamp $c$ is connected with the push button return switch G. It should be noted that extra contacts 109 are applied to the switches D, E and G for lighting the lamps 101, 102 and 103, and second extra contacts 111 on each switch E and G for lighting the lights 106 and 107.

It is evident that when one of the switches D, E or G is pressed that the respective station lamp a, b or c is lighted as hereinbefore described with the lamps 101, 102 and 103 in circuit. If the switch D is the one which has been pressed (corresponding to station a), then the route lights 104 and 105 are also lighted.

If the switch E is the one which has been pressed (corresponding to the station b), then the lights 106, 107 and 108 light as well as the lights 101, 102 and 103.

If the switch G is the one which has been pressed (corresponding to the station c) then the route lamps 101, 102, 103, 106 and 107 are lighted.

With this last scheme, it is evident that the temporary route lighting lamps 101, 102, 103, 106 and 107 are not on the flasher. For purposes of simplification Fig. 8 does not show the feeding circuit because that has been described hereinbefore.

It is evident that for changes in a map, that corresponding changes may be made in the wiring so that the effect disclosed herein is accomplished.

By using the 6-volt circuit described the fire hazard is reduced. The translator 59, flasher F and other auxiliaries such as main switches and so forth may be housed in the cabinet 1 as illustrated in Fig. 1.

As is evident from the above description, the switches 69, 71, 73, 89, 91, D, E and G are all of the automatically restoring type.

Extra switch buttons 113 are shown in Fig. 1. These are used to take care of changes which may be made in the map from time to time.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The display comprising a map, a home light thereon burning in a predetermined manner to indicate the location of the map on the map, a plurality of station lights also burning in a predetermined manner to indicate stations on the map, returnable means for lighting at least one of said station lights in a predetermined manner and means associated with and operable with said returnable means for darkening all the other station lights when said returnable means is operated.

2. The display comprising a map, a home light thereon burning in a predetermined manner to indicate the location of the map on the map, a plurality of station lights also burning in a predetermined manner to indicate stations on the map, returnable means for lighting at least one of said station lights in a predetermined manner, means associated with and operable with said returnable means for darkening all the other station lights when said returnable means is operated, and means permitting continuous burning of said home light in said predetermined manner when said operation is effected.

3. The display comprising a map, a home light thereon burning continuously, a plurality of station lights on said map, means for intermittently flashing said station lights, returnable means for causing continuous lighting of one of said station lights, and means associated with and operable with said returnable means for constantly darkening all the other station lights when said returnable means is operated.

4. The display comprising a map, a home light thereon burning continuously to indicate an observer's position, a plurality of station lights on the map burning in a normal predetermined manner, at least one route light on the map which is normally dark, means adapted to cause said route light to be lighted and returnable means for lighting at least one of said station lights and means associated with said returnable means and functioning therewith for darkening at least some of the other station lights when the aforesaid station light is lighted.

5. The display comprising a map, a home light thereon burning in a predetermined manner, station lights thereon divided into groups, means for flashing said groups intermittently, returnable means for causing continuous lighting of at least one of said station lights and means associated with said returnable means for darkening at least some of the other station lights.

6. The display comprising a map, a continuously burning home light thereon indicating the position of an observer of the map, station lights on the map divided into groups, means for intermittently flashing said groups, returnable means causing continuous lighting of at least one of said station lights, means associated with said returnable means for darkening all the other station lights when said one station light is lighted, at least one normally dark route light on said map, and independent returnable means for temporarily lighting said normally dark route light.

7. The display comprising a map, a home light thereon burning in a predetermined manner to indicate the position of an observer of said map, a plurality of station lights burning in a predetermined manner, returnable means for causing lighting of at least one of said station lights in a predetermined manner, means associated with the returnable means for darkening the other station lights, at least one light for lighting a route on the map from the home light to said lighted station light and independent returnable means for lighting said route light when said first named returnable means is operated to light said one station light.

8. The display comprising a map, a home light thereon burning in a predetermined manner to indicate the position of an observer of said map, a plurality of station lights burning in a predetermined manner, returnable means for causing lighting of at least one of said station lights in a predetermined manner, means associated with the returnable means for darkening the other station lights, a plurality of route lights upon the map, a plurality of routes adapted to be lighted by said route lights and means for temporarily lighting one of said routes from the home light to the said lighted station light when said returnable means is operated to light said one station light, said routes being at least in part arranged so that one comprises a portion of another.

In testimony whereof, I have signed my name to this specification this eighth day of June, 1927.

HARVEY S. PARDEE.